US009808658B1

(12) United States Patent
Rosenwach

(10) Patent No.: US 9,808,658 B1
(45) Date of Patent: Nov. 7, 2017

(54) TIE-ON ARRANGEMENT AND BRACKET FOR A TANK

(71) Applicant: Rosenwach Tank Co., LLC, Astoria, NY (US)

(72) Inventor: Andrew Rosenwach, Astoria, NY (US)

(73) Assignee: ROSENWACH TANK CO., LLC, Astoria, NY (US)

( * ) Notice: Subject to any disclaimer, the term of this patent is extended or adjusted under 35 U.S.C. 154(b) by 0 days.

(21) Appl. No.: 15/232,997

(22) Filed: Aug. 10, 2016

(51) Int. Cl.

| | |
|---|---|
| ***A62B 35/00*** | (2006.01) |
| ***F16M 13/02*** | (2006.01) |
| ***B65D 88/02*** | (2006.01) |
| ***B65D 90/02*** | (2006.01) |
| ***B65D 8/00*** | (2006.01) |

(52) U.S. Cl.
CPC ............ *A62B 35/0068* (2013.01); *B65D 9/04* (2013.01); *B65D 88/02* (2013.01); *B65D 90/02* (2013.01); *F16M 13/02* (2013.01)

(58) Field of Classification Search
CPC .... A62B 35/0068; B65D 88/02; B65D 90/02; B65D 9/04; F16M 13/02
USPC ............ 248/213.2, 238, 200, 300; 220/4.12; 182/3, 112
See application file for complete search history.

(56) References Cited

U.S. PATENT DOCUMENTS

| | | | | |
|---|---|---|---|---|
| 1,380,927 A * | 6/1921 | Ross | B65D 45/32 | 217/95 |
| 1,839,466 A * | 1/1932 | Craig | B65D 9/04 | 217/72 |
| 2,074,592 A | 1/1936 | Rowell | 52/223.3 | |
| 3,852,943 A * | 12/1974 | Healy | A62B 1/14 | 16/257 |
| 4,193,475 A | 3/1980 | Sweet et al. | 182/8 | |
| 4,632,218 A * | 12/1986 | Hannan | A62B 1/14 | 182/5 |
| 4,753,321 A * | 6/1988 | Winslow | E04G 1/20 | 182/145 |

(Continued)

FOREIGN PATENT DOCUMENTS

| | | |
|---|---|---|
| WO | WO 03/039681 | 5/2003 |
| WO | WO 2010/149691 | 12/2010 |
| WO | WO 2015/107021 | 7/2015 |

Primary Examiner — Anita M King
(74) Attorney, Agent, or Firm — Ostrolenk Faber LLP

(57) ABSTRACT

An installation for supporting a worker on a tank: The tank includes a plurality of vertical staves held to define a peripheral wall by a plurality of hoops. A top bracket at the top hoop has a tie-on receiving fixture for attachment to a worker's tie-on at the outer end of the bracket. The tie-on bracket on the top hoop is shaped to not pivot up and down around the top hoop. At least one lower hoop is located on the side of the tank. Each lower bracket at each lower hoop has a tie-on receiving fixture for attachment to a worker's tie-on at the outer end of the bracket. Each lower bracket is shaped and positioned for being able to be pivoted up and down around its lower hoop. A threaded end region on the end of a hoop segment passes through a hole in the respective bracket. A nut is tightened on the threaded end region for holding the bracket to a junction fixture on the end of a respective hoop segment. The adjacent hoop end regions or hoop segment end regions are held in the junction fixture to form the respective hoop.

8 Claims, 4 Drawing Sheets

(56) References Cited

U.S. PATENT DOCUMENTS

| | | | | |
|---|---|---|---|---|
| 7,240,770 | B2 * | 7/2007 | Mullins | E04G 21/3261 182/3 |
| 8,096,384 | B2 * | 1/2012 | Caylor | A62B 1/04 182/3 |
| 2002/0148680 | A1 * | 10/2002 | Lee | A62B 35/0068 182/3 |
| 2014/0076903 | A1 * | 3/2014 | Rosenwach | B65D 9/04 220/567 |

* cited by examiner

TIE-ON ARRANGEMENT AND BRACKET FOR A TANK

BACKGROUND OF THE INVENTION

The invention concerns a tie-on arrangement for a worker on a tank, for example a water tank, which is, for example fabricated of wood staves and which staves are held together by hoops that encircle the tank and hold the staves upright and hold adjacent staves together to define the peripheral wall of the tank. As a non-limiting example, the tank is for holding a liquid, particularly water, and more particularly, the tank may be a water tank that is placed at the top of a building, e.g. on the roof, to supply water to the building below the tank for various purposes.

Such a tank must be periodically serviced by workers who may stand on top of the tank or who may work on the side of the tank and who may be suspended or supported at the side of the tank as they perform their service. Installations are provided for allowing the worker to attach to the tank, to avoid the worker falling off the tank. A worker attaches himself to the tank at a tie-on. One example is a harness on a worker attached by a tie-on to a bracket attached to the tank.

In the relevant prior art and the invention, a "tie-on" refers to a fixture on the side or the top of a tank to which a worker's cooperating attaching and/or safety and support fixture may be attached. For example, this may include a fixture like a bracket on the tank to which a connector from a support or harness for the worker may be separably attached, so that the two connected parts together define the tie-on.

The invention concerns at least two different tie-on installations on the tank, one preferably for workers who are at or on the top of the tank when performing their service and the other preferably for workers who are at or on the side of the tank when performing their service. When the two types of tie-on installations are installed on a tank, a worker tied on to a tie-on installation may safely operate at the top and the side of the tank.

THE PRIOR ART

Numerous types of safety installations known in the art provide safe access for a worker to the side and/or the top of the tank. Non-limiting examples of these include rails, ropes or cables or other devices running vertically on a side of the tank to which a worker may "tie-on" e.g. affix an attachment harness, or a like support.

Various types of brackets may be attached at a side of the tank. A support fixture attached to a worker may in turn be attached to a bracket. A bracket embodiment may include a bracket that projects outwardly from or can be swung out from the side of the tank to be engaged by the worker's support fixture. In one form, the bracket may be supported at the side of the tank and may be configured to prevent pivoting of the bracket up or down and thereby prevent the worker's support fixture and tie-on from pivoting up or down. In another form, the bracket may be supported at the side of the tank to be pivotable upwardly or downwardly around a pivot location on the tank, so that the worker's support fixture attached to the bracket may pivot up or down, for example, depending upon the worker's selected location e.g., height, at a side of the tank.

In a typical embodiment, a water tank used on a building is comprised of a peripheral wall which is typically comprised of a plurality of vertical wood staves arrayed around an axial center to define a peripheral sidewall of the tank. Typically, metal hoops are wrapped around the periphery of the tank outside the staves at several heights along the staves to hold the staves to define the peripheral sidewall of the tank. The typical tank is at least several feet in height, typically taller than a worker who ties onto the tank at a location above the bottom of the tank.

It is known to attach tie-on brackets at the side of a tank, for example to attach tie-on brackets at one or more of the hoops. The hoop to which a worker is to be tied on is selected to correspond to a worker's position at the tank.

The prior art shows tanks having vertically oriented wooden staves and hoops around the tank staves. One type of hoop may be comprised of one piece, with a separation in it defining ends to be joined. Alternatively, another type of hoop may be comprised of a plurality of arcuate shape segments, wherein adjacent segment ends are coupled together to complete a hoop around the tank wall.

U.S. Pat. Nos. 1,380,927 and 2,074,592 and International Patent Publication WO2015/107021 show a tank, such as a water tank, with hoops around its staves or wall elements, but do not disclose either brackets on the tank wall or the hoops to which a tie-on might be connected.

Vertically extending connections for a safety bracket fixture for a tank are disclosed in International Patent Publication WO2003/039681 that may be installed on a tower, pylon, or the like using fixed brackets which do not pivot on the tank but may be located along a vertically extending tower, pylon, et al. U.S. Pat. No. 4,193,475 shows a vertical safety rail on a hoop, but no bracket. International Patent Publication WO2010/149691 attaches a bracket to a vertical track, such as a rope to which a bracket is supported. U.S. Pat. No. 3,852,943 shows clamping a worker's safety belt to an upright safety rope.

SUMMARY OF THE INVENTION

No prior art known to the inventor hereof discloses brackets for a worker's tie-on, wherein the brackets are located on the hoops of a tank and comprise either only non-pivotable or only pivotable brackets or a combination of both types of hoops. Mostly, up to all non-pivotable, fixed orientation brackets are located at an upper hoop that is at or toward the top of the tank. In a preferred embodiment only non-pivotable brackets are at the top hoop of the tank. The non-pivotable brackets are not pivotable either up or down around their respective hoops. In another embodiment, non-pivotable hoops are possibly mixed on the upper hoop with a preferably small quantity of pivotable brackets.

Other, pivotable brackets are supported on at least one hoop or on more than one hoop. The pivotable brackets are mostly located lower on a side of the tank and below the top hoop. These brackets are pivotable preferably both up and down around their hoop, as a worker may require for locating and supporting himself on the side of the tank.

A tank is preferably comprised of a peripheral wall of preferably upstanding wooden staves, and is preferably for containing a supply of water. It may be installed at the top of a building, structure, or the like. The tank has several hoops around the wall at various heights along the wall. A worker may work on the top of the tank or at various height locations on the side of the tank. There are preferably tie-on receiving fixtures at the top hoop or maybe at more upper hoops near or at the top of the tank and also at lower hoops below the upper hoops, located at various heights on the side of the tank. A complementary worker's safety fixture or tie-on may be attached to a tie-on receiving fixture of a bracket for supporting the worker against falling to the ground from the tank.

Each hoop encircles the peripheral sidewall of the tank. In a preferred embodiment, a hoop is comprised of several separate, arcuate hoop segments. Each segment has opposite end regions and each end region of a hoop segment is connected at a junction fixture to an end region of an adjacent hoop segment. The connection at the end regions may be of a known type, including a junction fixture in which the adjacent segment ends are connected or a bolt connection, or otherwise known in the art.

A tie-on receiving fixture on the tank, to which a worker's tie-on safety fixture may be secured, comprises a bracket supported on a tank hoop, and preferably at a junction fixture between two adjacent end regions of the hoop segments. A bracket held at an end region of a hoop segment normally prevents the bracket from moving laterally around the hoop.

Each bracket includes a plate or other form of a body of the bracket and is held to the tank by a hole through the bracket through which an end region of a hoop segment passes. Spaced outward on the bracket plate away from the hoop on which the bracket is disposed, there is a worker's tie-on safety support fixture receiver, which in a simple form may include another hole in the bracket plate, at which a worker's tie-on may be attached. The safety support fixture of the bracket is complementary to the worker's tie-on safety fixture, which can be tied onto the tie-on support fixture or the worker can otherwise hook onto the bracket, e.g. with an appropriate hook or with a lock on feature or a simple tie-on rope or lanyard, which is attached to a safety harness on the worker.

In a preferred form, all of the non-pivotable brackets or at least most of a plurality of non-pivotable brackets are at an upper hoop and preferably a top hoop, that is at or toward the top of the tank, and are supported on the upper hoop. Each non-pivotable bracket projects radially out from the peripheral wall of the tank and is not pivotable up or down around the upper hoop. In a preferred embodiment, this can be accomplished by an inward facing side surface of the non-pivotable bracket being flat against the tank stave which is inward of the respective non-pivotable bracket, so that the inward side surface of the bracket cooperates with the surface of the stave to prevent pivoting of the non-pivotable bracket. The non-pivotable brackets may be disposed on the top hoop or at least an upper hoop, to be preferably located for receiving the tie-on safety fixture of a worker who is then at or on the top of the tank.

In a preferred form, a plurality of pivotable hoop brackets are preferably at lower hoops located down the side of the tank. Being pivotable, they can be pivoted to be oriented up or down for a worker then above or below that bracket at the wall of the tank. The pivotable brackets do not have an inward facing surface toward the tank wall that is shaped to prevent pivoting of the top bracket. For example, the inward facing surface of at least some pivotable brackets are spaced from the tank wall and/or are rounded or so shaped that the pivotable bracket can pivot up or down while that bracket is supported at the hoop.

Both types of brackets may be placed on their respective hoops during the step of assembly of the hoops on the tank. Each type of bracket may be positioned either at the top hoop or a hoop near the top hoop or at a hoop lower on the side of the tank. It is not precluded, but is contrary to their intended uses, if some of the non-pivotable brackets may be on lower hoops along with pivotable brackets or that some of the pivotable brackets may be on the upper hoops or the top hoop along with non-pivotable brackets on the upper hoops.

BRIEF DESCRIPTION OF THE DRAWINGS

Other objects and features of the present invention are disclosed with reference to the accompanying drawings in which FIG. 1 schematically represents a tank on the roof of the building with a worker safety installation as disclosed herein.

DESCRIPTION OF AN EMBODIMENT OF THE INVENTION

Figures 1, 2, 3:
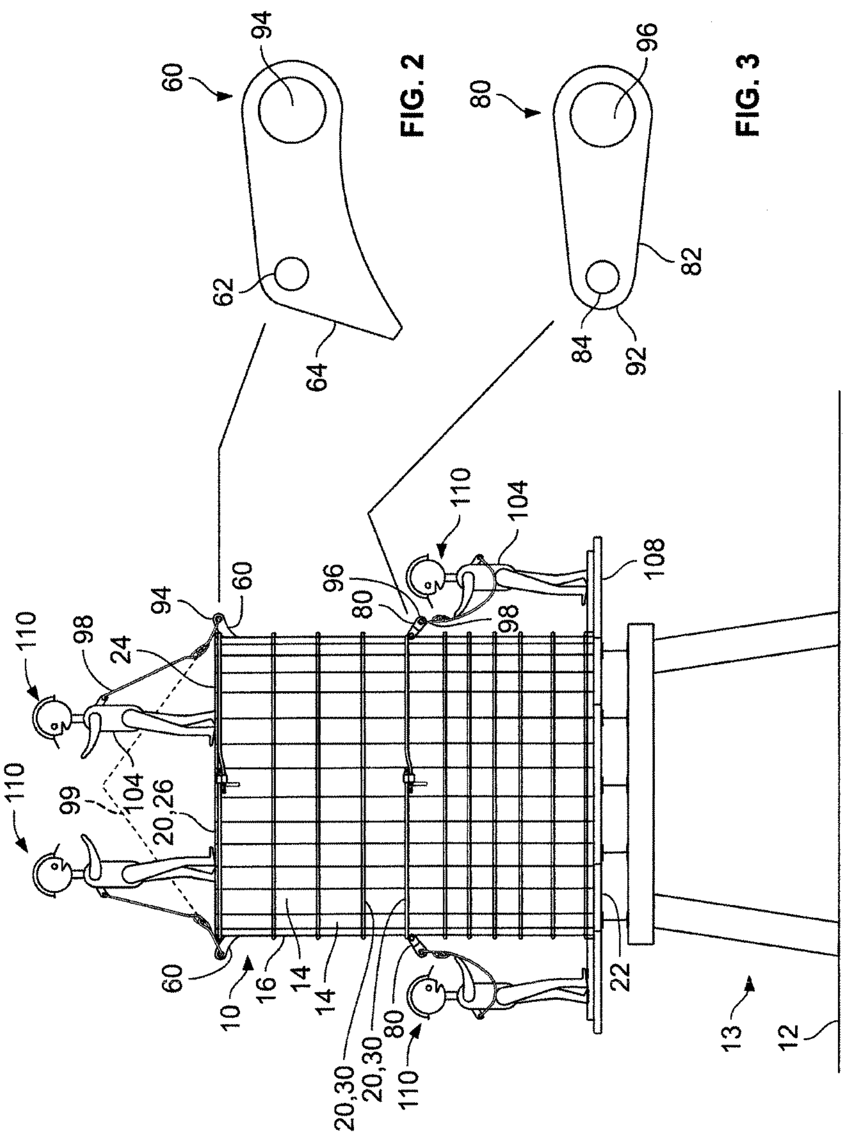
FIG. 2 illustrates a non-pivotable hoop bracket for a worker's tie-on in an embodiment which prevents pivoting of the bracket up and down around a hoop at a peripheral wall around the tank.
FIG. 3 illustrates a pivotable hoop bracket for a worker's tie-on in an embodiment which permits the bracket to pivot up and down around a hoop at a peripheral wall around the tank.
Figure 4:
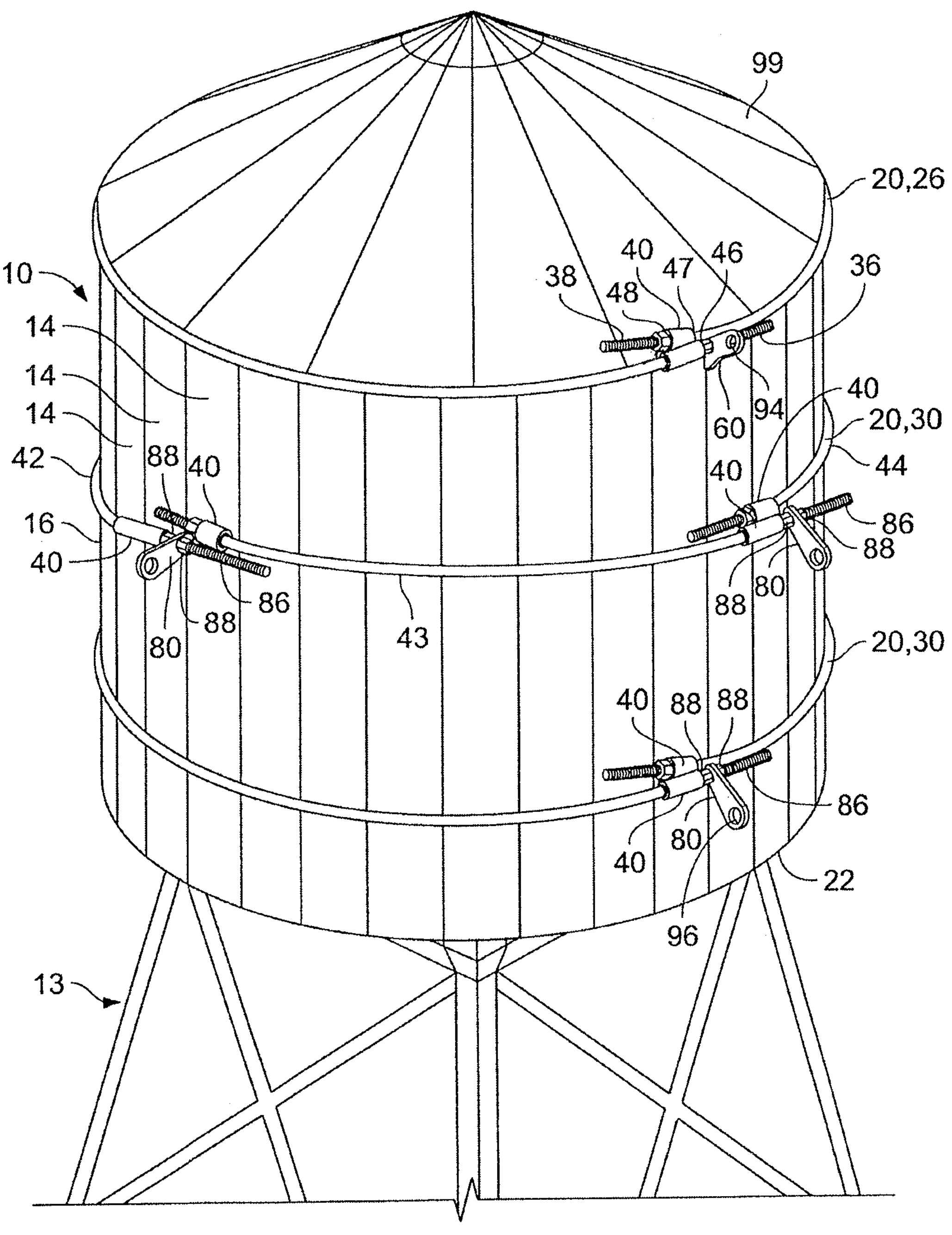
FIG. 4 is a partial, enlarged side view of a tank wall including an embodiment of the invention.

FIGS. 1 and 4 are schematic views of a tank 10 for containing a fluent material or liquid material, here a tank for containing water. The tank 10 is disposed above a roof 12 of a building and is supported by an appropriate structure 13. But, such a tank may be located elsewhere, as its particular use requires. The tank 12 is comprised of a circular array of upstanding staves 14, preferably of wood, arrayed around a vertical center axis and defining a circular shape of a peripheral sidewall 16 for the tank. The staves are arranged side by side around the tank defining the sidewall which retains water in the tank.

A plurality of hoops 20 are arrayed around the tank staves 14 at various heights above the bottom 22 of the tank and including an upper hoop 26 at or just below the top 24 of the tank. Down from the top of the tank, there are an array of vertically spaced apart lower hoops 30 around the tank sidewall.

Figure 7:
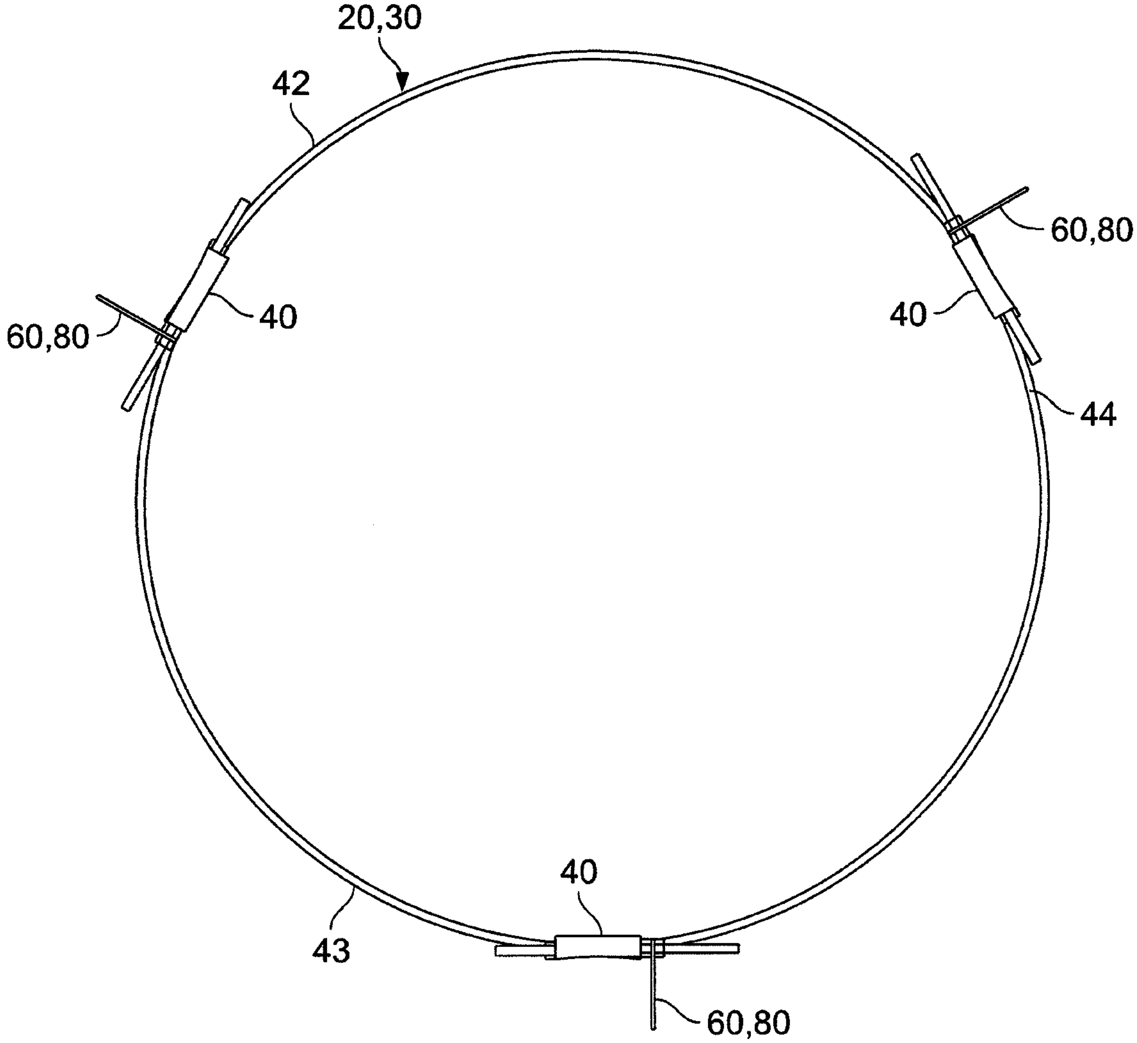
FIG. 7 illustrates a hoop formed of a plurality of hoop segments joined at adjacent end regions of adjacent segments.

As shown in FIGS. 4 and 7, a hoop 20 may be comprised of a plurality of arcuate segments 42, 43, 44 which are assembled together into a hoop by the adjacent end regions 36, 38 of neighboring segments being attached together by a junction fixture 40 to an end region of a respective adjacent hoop segment for the segments to be attached to define a circular hoop. Adjacent segment ends are attached at a junction fixture 40 to hold both hoop end regions 36, 38 and allows or enables the hoop end regions to be drawn to tighten the hoop 20 around the staves 14.

The end regions of adjacent hoop segments are held in their junction fixture 40 so that one end region 36 of the hoop segment extends out an opening 46 in one side 47 of the junction fixture in one direction, while the other adjacent end region 38 of a hoop segment extends in the opposite direction out through another opening 48 in the junction fixture 40. An end region 36 of a segment further extends through a below described hole 62, 84 in a respective below described tie-on receiving bracket 60, 80.

Figure 5:
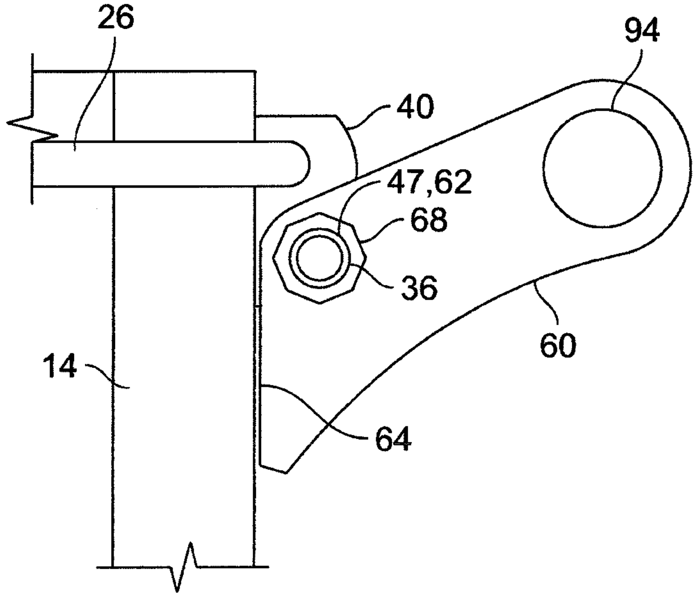
FIG. 5 is a view of a mounted non-pivotable bracket.

On the upper hoop 26 at or toward the top of the tank, there are in this embodiment a plurality of worker supporting non-pivotable brackets 60, each configured to prevent pivoting of the non-pivotable brackets 60 up or down around their respective upper hoop 26. The non-pivotable brackets are useful for their placement at or just below the top 24 of the tank on the upper hoop 26. In its simplest illustrated form in FIG. 2, the non-pivotable bracket 60 comprises a metal or steel plate of sufficient material and thickness as to support a worker who may be falling from the top of the tank. But, it may have another configuration such that it performs the functions described herein. When installed on the upper hoop 26, each non-pivotable bracket 60 projects out from the tank wall. See FIG. 5.

Each non-pivotable bracket 60 has a first bracket mounting, hoop receiving hole 62 near a radially inwardly facing end 64 of the bracket. The inwardly facing end 64 is uncurved and of such height along the adjacent stave 14 that when the non-pivotable bracket 60 is attached to its upper hoop 26, the bracket 60 is prevented from moving laterally around the hoop by the bracket being urged against the respective junction fixture 40 and is prevented from pivoting either up or down when pulled upwardly by a worker on the tank wall or downwardly by a worker who may have moved down the tank wall or fallen off the tank.

In particular, the non-pivotable bracket 60 is prevented from moving laterally around the hoop by the end region 36 of the hoop segment on which the bracket is positioned being threaded and by nuts 68 holding the non-pivotable bracket 60 on the threaded end region of the hoop segment, preferably pressed against the junction fixture 40, as the hoop holds the non-pivotable bracket inward surface 64 against the adjacent tank stave 14. The nuts 68 are tightened to hold the bracket 60 to the end region of the hoop segment on the threaded end region 36 until the nuts urge the respective bracket 60 against a surface of the junction fixture 40.

Tightening the nut 68 also tightens the hoop around the wall of the tank, which secures the neighboring staves together in the peripheral wall and fixes the upper and lower hoops at their selected heights.

Referring to FIGS. 1, 3, 4 and 6 on the lower hoops 30 located vertically down along the tank wall 16, there is a different type of pivotable bracket 80, which projects out from the side wall of the tank. Like the non-pivotable bracket 60, the pivotable bracket 80 may be a metal or steel plate of a material and thickness that a worker who may pull up or down on the bracket 80 or may fall past that bracket will not cause that bracket to deform. The bracket 80 has a radially inward end region 82 with a hole 84 through which a threaded end region 86 of a hoop segment passes. A nut 88 is tightened on the threaded end region 86 and urges the bracket 80 against the surface of the junction fixture 40 located between end regions of the hoop 30 or hoop segments, as occurs with the other bracket 60. As each bracket is positioned on an end of a hoop segment, there is only one bracket held on a junction between adjacent hoop segment ends for each hoop segment. If a hoop comprises three hoop segments, only three of the brackets are held at the spaced intervals between hoop segments as seen in FIGS. 4 and 7.

Figure 6:
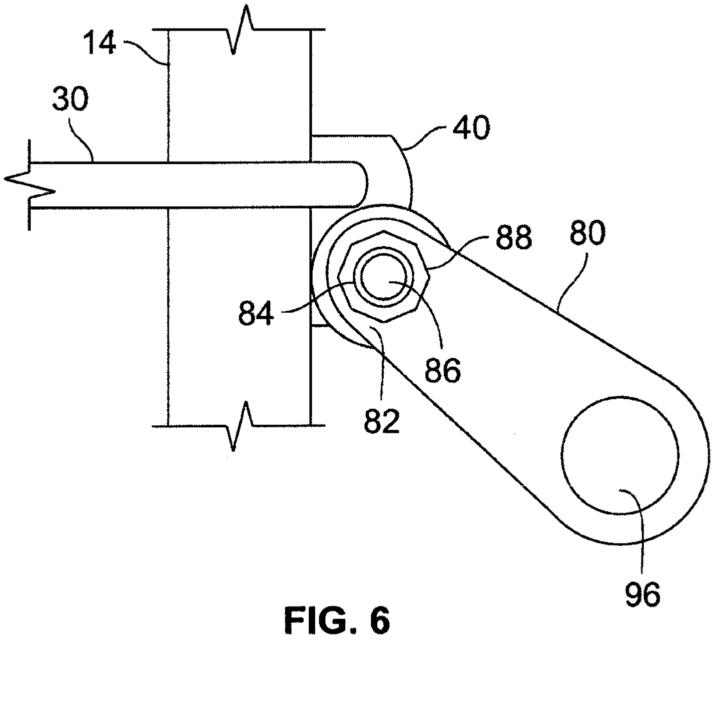
FIG. 6 is a view of a mounted pivotable bracket.

As shown in FIGS. 3, 4 and 6, the inward side 92 of the pivotable bracket 80 is not flat like the inward side 64 of the non-pivotable bracket 60. Rather, the inward side 92 is illustrated as rounded in shape and is positioned so as to not contact the adjacent, radially bracket stave 14. This permits the pivotable bracket 80 to pivot up or down, depending upon whether the worker's harness or attachment to his safety fixture is above or below the bracket 80, where the worker wants it positioned, or if the worker has fallen off the tank toward the roof.

Toward the radially outward end of each of the non-pivotable 60 and the pivotable 80 brackets and spaced away radially from the stave 14 inward of each bracket, there is a respective tie-on attachment fixture, 94 for the non-pivotable bracket 60 and 96 for the pivotable bracket 80, which is configured to cooperate with a corresponding tie-on 98 or other fixture on a worker's harness 104 or safety belt, or the like. The tie-on receiving fixture 94, 96 is configured to receive the tie-on for detachable attachment of the tie-on to the bracket.

As shown in FIG. 1, the tank has a flat top 24. A worker can stand on it to work. Above top 24, the tank has a conical shape outer cover 99 shown in FIG. 4. When a worker works on or at the top of the tank, the cover 99 may be temporarily removed so it is shown in broken lines in FIG. 1.

As shown in FIG. 1, one or more workers 110 may stand on or work on the top 24 of the tank typically with the cover 99 temporarily, entirely or partially removed broken lines in FIG. 1. Workers may work at a side of the tank and either may stand on a catwalk 108, or the like, around the tank, e.g. toward the bottom of the tank, or may be suspended from the tank by a connection and particularly a tie-on 98 between the harness 104 on the worker 110 and a bracket 60, 80 on the tank.

A worker 110 on the top of the tank, whose tie-on is attached to a non-pivotable bracket 60 toward the top of the tank, can move about without the corresponding bracket 60 pivoting either up or down with respect to an upper hoop 26, because pivoting of the non-pivotable bracket 60 is prevented due to the shape 64 of that bracket.

FIGS. 4 and 7 shows hoop 20 comprised of three hoop segments 42, 43, 44 and adjacent ends of neighboring adjacent segments are attached by a junction fixture 40. The number of hoop segments is a matter of choice for a particular tank. A hoop design without segments, but with one separation at is ends may be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An arrangement for attaching a tie-on to a tank, comprising:

a tank comprising a top, a bottom and a peripheral wall extending between the top and the bottom;

an upper hoop toward the top of the tank and around the peripheral wall;

at least one lower hoop below the top of the tank, below the upper hoop, above the bottom of the tank and around the peripheral wall;

at least some of the hoops being configured to support a respective bracket on the hoop;

a non-pivotable bracket supported on the upper hoop and extending outward from the peripheral wall, the non-pivotable bracket including a first hole in the non-pivotable bracket through which the upper hoop passes for supporting the non-pivotable bracket on the upper hoop;

the non-pivotable bracket having an inward surface facing toward the peripheral wall of the tank, the inward surface is shaped such that with the non-pivotable bracket supported on the upper hoop, the inward surface of the non-pivotable bracket cooperates with the peripheral wall of the tank to prevent pivoting of the non-pivotable bracket up or down around the upper hoop and with respect to the peripheral wall of the tank;

a pivotable bracket supported on at least one of the lower hoops and being pivotable around the at least one of the lower hoops and extending outward from the peripheral wall of the tank, the pivotable bracket including a respective second hole in the pivotable bracket through which the at least one lower hoop passes for supporting the pivotable bracket on the at least one of the lower hoops;

the pivotable bracket having an inward surface toward the peripheral wall of the tank, the inward surface of the pivotable bracket is located, shaped and configured so as to not prevent and to permit pivoting upward and downward of the pivotable bracket around the at least one lower hoop and with respect to the peripheral wall of the tank; and each of the non-pivotable and the pivotable brackets having a tie-on receiving fixture thereon spaced outward from the respective first or second hole of the respective bracket and configured for receiving a worker's tie-on fixture, by which a worker's tie-on is attached to a tie-on receiving fixture; and cooperation between the tie-on at the pivotable bracket and the pivotable bracket being configured to permit pivoting of the pivotable bracket upward and downward with respect to the respective lower hoop for the pivotable bracket and with respect to the peripheral wall of the tank.

2. The arrangement of claim 1, wherein the peripheral wall of the tank is comprised of a plurality of vertically extending staves extending between the top and the bottom of the tank, and the hoops surrounding the peripheral wall of the tank and the staves to define the tank.

3. The arrangement of claim 2, wherein the inward surface of the non-pivotable bracket engages a first stave inward of the non-pivotable bracket, and the location and shape of the inward surface of the non-pivotable bracket is selected to cooperate with the first stave for blocking pivoting of the non-pivotable bracket up and down with respect to the upper hoop.

4. The arrangement of claim 3, wherein the inward surface of the pivotable bracket faces toward a respective second stave of the tank and is shaped and located with respect to the respective second stave so that the inner surface of the pivotable bracket does not contact the respective second stave, thereby permitting the pivotable bracket to pivot up and down around the respective hoop for the pivotable bracket.

5. The arrangement of claim 1, wherein each hoop comprises a plurality of hoop segments, each segment having end regions at opposite ends of each segment and respective end regions of each hoop segment being joined to adjacent end regions of adjacent hoop segments to form the hoops.

6. The arrangement of claim 5, wherein a respective end region of each segment of each of the upper and lower hoops is threaded and is sized to pass through one of the first or the second holes through a respective one of the brackets which receives a respective one of the hoops;

a respective one of the brackets is disposed on the threaded end region of the respective hoop segment for the bracket; and a nut threaded on the threaded end region of the segment of the hoop, the nut being configured for being tightened on the threaded end region and against the respective bracket on the threaded end region and for urging the respective bracket into engagement with a surface at the respective hoop for preventing movement of the bracket around the respective hoop.

7. The arrangement of claim 6, further comprising a junction fixture between adjacent hoop segment end regions wherein the adjacent hoop segment end regions are held by a respective one of the junction fixtures, and each junction fixture is shaped to expose the threaded end region at each junction fixture to receive the nut on the threaded end region; and a surface on the hoop to which the respective bracket is urged is on the junction fixture.

8. The arrangement of claim 7, wherein each of the segments of at least one hoop has end regions and at least one of the end regions of each pair of adjacent hoop segments of the at least one hoop is threaded;

the respective bracket for the at least one hoop is placed on the threaded end region of one of the segments of the hoop; and the nut threaded on the threaded end region is located and configured for holding the respective bracket on the threaded end region and at the respective junction fixture of the at least one hoop.

* * * * *